(12) United States Patent
Sparrowhawk (10) Patent No.: US 9,290,358 B2
(45) Date of Patent: Mar. 22, 2016

(54) RETRACTABLE IN-WALL CABLE SYSTEM (71) Applicant: Leviton Manufacturing Co., Inc., Melville, NY (US)

(72) Inventor: Bryan L. Sparrowhawk, Monroe, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 141 days.

(21) Appl. No.: 14/212,146

(22) Filed: Mar. 14, 2014

(65) Prior Publication Data

US 2014/0263796 A1     Sep. 18, 2014

Related U.S. Application Data (60) Provisional application No. 61/790,999, filed on Mar. 15, 2013.

(51) Int. Cl.
  *B65H 75/36*     (2006.01)
  *B65H 75/44*     (2006.01)
  *H02G 11/02*    (2006.01)
  *H02G 3/18*     (2006.01)

(52) U.S. Cl.
  CPC ........... *B65H 75/4449* (2013.01); *H02G 11/02* (2013.01); *B65H 2701/34* (2013.01); *H02G 3/18* (2013.01)

(58) Field of Classification Search
  CPC ....... B65H 75/28; B65H 75/48; B65H 75/368
  USPC .................... 242/388.9, 388.91, 594.2–594.4
  See application file for complete search history.

(56) References Cited

U.S. PATENT DOCUMENTS

| 2,010,006 | A | * | 8/1935 | Bosch, Jr. ............ | B65H 75/368 242/364.9 |
| 5,086,194 | A | | 2/1992 | Bruinsma | |
| 5,374,812 | A | | 12/1994 | Chan et al. | |
| 5,700,158 | A | | 12/1997 | Neiser et al. | |
| D399,488 | S | | 10/1998 | Williams | |
| 6,004,011 | A | | 12/1999 | Sieczkowski | |
| 6,174,199 | B1 | | 1/2001 | Rushing | |
| 6,351,591 | B1 | | 2/2002 | Daoud | |
| 6,379,166 | B1 | | 4/2002 | Hagarty et al. | |
| 6,400,133 | B1 | * | 6/2002 | Vest ....................... | H01R 13/72 242/400 |
| 7,381,893 | B2 | | 6/2008 | Kerr, Jr. | |
| 7,714,227 | B2 | | 5/2010 | Sparrowhawk et al. | |

(Continued)

OTHER PUBLICATIONS

Randl Industries, Inc.; Making Communications & Fire Protection More Reliable and Cost-Effective; Product Specifications T-55017; 2009; 1 page; Randl Industries, Inc.; Spokane, WA; USA.

(Continued)

*Primary Examiner* — Sang Kim
(74) *Attorney, Agent, or Firm* — Leviton Manufacturing Co., Inc.

(57) ABSTRACT

A retractable cable system for coiling and uncoiling a cable. The system preferably includes an axle, a first drum having a spring nested inside the drum, a second drum, and a pulley assembly. The first drum is configured to be non-rotatably coupled to the axle while the second drum is configured to rotate around the axle. A cable is configured to wrap around the first and second drums and the pulley assembly, in which one of the ends of the cable is fixed to the system. The system prevents the cable from being twisted and allows the cable to maintain its geometry as the cable is being coiled and uncoiled.

11 Claims, 9 Drawing Sheets

(56) References Cited

U.S. PATENT DOCUMENTS

| | | |
|---|---|---|
| 8,469,303 B2 | 6/2013 | Feldstein et al. |
| 8,469,305 B2 | 6/2013 | Feldstein et al. |
| 8,657,224 B2 | 2/2014 | Feldstein et al. |
| 8,720,657 B2 | 5/2014 | Kramer et al. |
| 2013/0068870 A1 | 3/2013 | Feldstein et al. |
| 2013/0264409 A1 | 10/2013 | Feldstein et al. |

OTHER PUBLICATIONS

Randl Industries, Inc.; Making Communications & Fire Protection More Reliable and Cost-Effective; Product Specifications T-55057; 2008; 1 page; Randl Industries, Inc.; Spokane, WA; USA.

Thomas & Betts; Products; Product information page from catalog; 2006; 3 pages; Thomas & Betts Corporation; www.tnb.com; Memphis, TN, USA.

Erico; Caddy Box Mounting Brackets—For Between Studs; Product Specification Sheet; 2008; 4 pages; ERICO International Corporation; Solon, Ohio; USA as well as worldwide offices.

Panduit Network Connectivity Group, Specification Sheet, Mini-Com Multi-Media/Fiber Surface Mount Boxes, 2002.

Crestron Electronics, Inc., Specification Sheet, Cable Retractors for FlipTops™, 2013; 4 pages.

Yanko Design, Rambler Socket Built-in Wall Extension Cord, 2010, http://www.yankodesign.com/2009/12/24/recoiling-socket-in-the-wall/.

Pull Down Ceiling Light, http://www.ebay.com/bhp/pull-down-ceiling-light, 7 pages.

\* cited by examiner

RETRACTABLE IN-WALL CABLE SYSTEM

CROSS REFERENCE TO RELATED APPLICATION(S)

This application claims the benefit of U.S. Provisional Application No. 61/790,999 titled Retractable In-Wall Cable System, filed on Mar. 15, 2013, which is incorporated herein by reference in its entirety.

FIELD OF THE DISCLOSURE

The present disclosure relates generally to cable management and storage and, more particularly, relates to a system and method for a retractable cable or cord.

DESCRIPTION OF THE RELATED ART

Cords and cables (collectively referred to herein as a "cable"), such as extension cables and telephone cables, can easily become tangled and unorganized and sometimes create trip hazards. Furthermore, such used and/or stored cables often take up valuable usable space. To alleviate some of these issues, conventional retractable systems may be used to manage and/or store such cables. These types of cables may be effectively managed using conventional retractable devices, as such cables tend to be relatively durable and can tolerate the twisting and/or torsional stress placed on the cable by such retractable systems.

In contrast, some cables including, but not limited to, signal carrying telecommunications cables such as copper cables, fiber cables, other data cables, etc., tend to be more fragile than other types of cables and cannot tolerate such twisting and/or torsional stress. If such cables are not properly handled, managed and stored, signal integrity may be compromised, and over time, the structural integrity of such cables may also be compromised rendering the cables unusable for signal transmission. In addition, such cables may include a plurality of transmission media including, but not limited to, wires and optical fibers that may require geometric control and/or bend radius control.

The requirements of geometric control, bend radius control, and little or no torsional stress for certain types of cables may create challenges for coiling and uncoiling such cables. Many conventional retractable systems used for some types of cables may not prevent the cable from twisting or sustaining torsional stress, and therefore cannot be used for cables, such as telecommunication cables, where structural integrity is critical to utility. Furthermore, conventional retractable systems that may have a spinning or rotational joint, to prevent torqueing and twisting of the cable, may not be useful with certain cables if they fail to control the geometry of the retracted cable where structural integrity of the cable is critical for its utility e.g. in signal transmission.

Therefore, it would be desirable to have a retractable system that can be used for a cable without compromising structural integrity, geometric control and/or bend radius control of the cable. It would also be desirable to have a retractable cable management and storage system that may be installed, securely yet flexibly, within a wall or other enclosed area. The present application provides these and other advantages as will be apparent from the following detailed description and accompanying figures.

SUMMARY OF THE DISCLOSURE

A retractable cable system for coiling and uncoiling a cable is disclosed. The system preferably includes an axle, first and second drums, a shaft-pulley assembly and a spring. In use, the first drum is adapted and configured to be non-rotatably coupled to the axle, while the second drum is adapted and configured to be rotatably coupled to the axle. The shaft-pulley assembly preferably includes a shaft having a first end and a second end, and a pulley having an outer circumference, in which the first end of the shaft is adapted and configured to be rotatably coupled to the axle, and the second end of the shaft is adapted and configured to couple to the pulley. The spring is preferably adapted and configured to couple to the shaft, and the first drum provides torque to the shaft as the shaft rotates with respect to the axle. A cable is preferably configured to wrap around the first and second drums and the outer circumference of the pulley, in which the second drum and the shaft-pulley assembly rotate around the axle when the cable is being coiled and uncoiled.

In a second, alternate embodiment of a retractable cable system for coiling and uncoiling a communication cabling, the system preferably includes first and second drums, an axle, and a pulley-mounting assembly. In use, the first drum includes a first aperture formed therein, while the second drum includes a second aperture and is adapted and configured to be at least partially nested inside the first drum. The axle is sized and configured to extend at least partially into the first and second apertures formed in the first and second drums, respectively, as the first drum is non-rotatably coupled to the axle and the second drum is rotatably coupled to the axle. The pulley-mounting assembly preferably includes an arm and a pulley system. The arm preferably includes a first side and a second side, the first side being substantially perpendicular to the second side, and the first side having an aperture adapted and configured to receive the axle. The pulley system is adapted and configured to move along the second side of the arm. Furthermore, the retractable cable system for coiling and uncoiling the communication cabling includes a spring positioned on the axle between the first drum and the first side of the arm. The cable is configured to wrap around at least a portion of each of the first and second drums and the pulley, in which the second drum and the pulley-mounting assembly rotate around the axle as cable is being coiled and uncoiled.

BRIEF DESCRIPTION OF THE SEVERAL VIEWS OF THE DRAWING(S)

One or more aspects of the present invention are particularly pointed out and distinctly claimed as examples in the claims at the conclusion of the specification. The foregoing and other objects, features, and advantages of the present invention may be more readily understood by one skilled in the art with reference being had to the following detailed description of several embodiments thereof, taken in conjunction with the accompanying drawings wherein like elements are designated by identical reference numerals throughout the several views, and in which:

DETAILED DESCRIPTION

The present disclosure describes an apparatus and system for a retractable cable that may include two or more drums, an axle, a shaft, a spring, and a pulley. In some embodiments, the retractable cable apparatus and system may be installed within a wall cavity or other enclosed space. Embodiments will be described below while referencing the accompanying figures. The accompanying figures are merely examples and are not intended to limit the scope of the present disclosure.

FIGS. 1A-3C illustrate an exemplary embodiment of a cable system 1 according to the present invention. The cable system 1 stores and manages a cable, such as but not limited to, a cable requiring structural integrity to be maintained. The cable system 1 is adapted and configured for a cable 10 to be coiled and uncoiled in a manner that puts little or no torsional stress, twisting, and/or bending forces on the cable 10, while anchoring and securely attaching a second end 30 of the cable 10, or a portion of the cable 10 adjacent to the second end 30, to a first drum 40 and simultaneously controlling and maintaining the bend radius of the retracted cable to comport with relevant industry standards. This allows for the cable 10 to be coiled and uncoiled without adversely affecting the structural integrity of the cable 10 and without compromising, for instance, the signal integrity of the cable 10. That is, the cable system 1 maintains geometric control and bend radius control of the cable 10 while it is coiled and uncoiled, which may be critical for certain types of cables (e.g., copper cables, fiber cables, patch cords, etc.). Bend radius and geometric control may be particularly critical in cables such as, but not limited to, fiber optic cables because fiber optic cables typically include glass fibers that require bend radius control to maintain structural integrity. Nonetheless, the cable system 1 may be adapted and configured to be used in conjunction with all types of cables that may be retracted. Some non-limiting examples of cables include communication and telecommunication cables/cords including, but not limited to, copper patch cords, fiber patch cords, audio cords, video cords, audiovisual cords, USB cords, HDMI cords, headphone cords, Thunderbolt cords, Firewire cords, and cabling/cords for enterprise applications, data center applications, residential applications, telecommunications for high speed communications, etc.

Figure 1A:
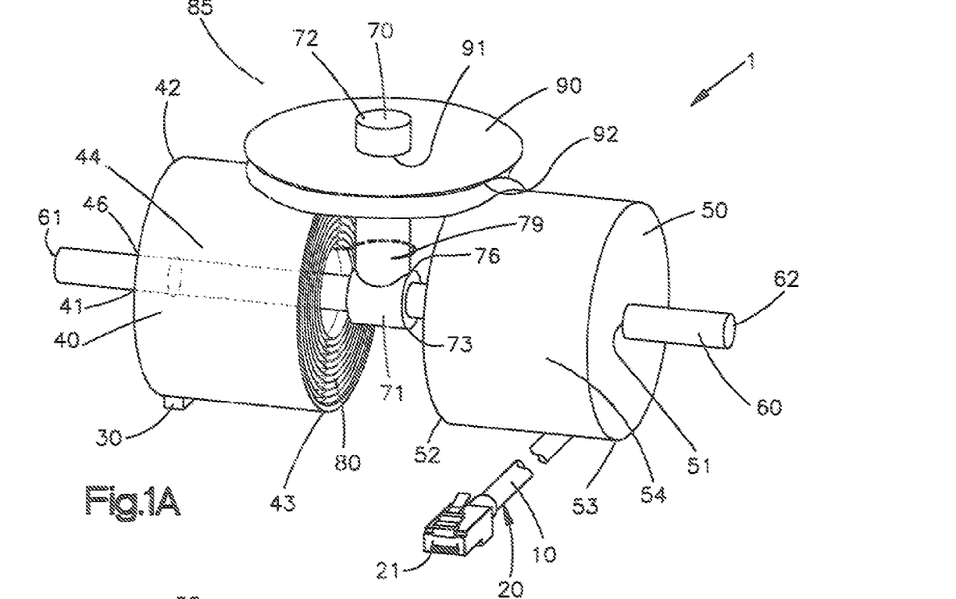
FIG. 1A is a perspective view of an exemplary embodiment of a system in which a cable is uncoiled.
Figure 1B:
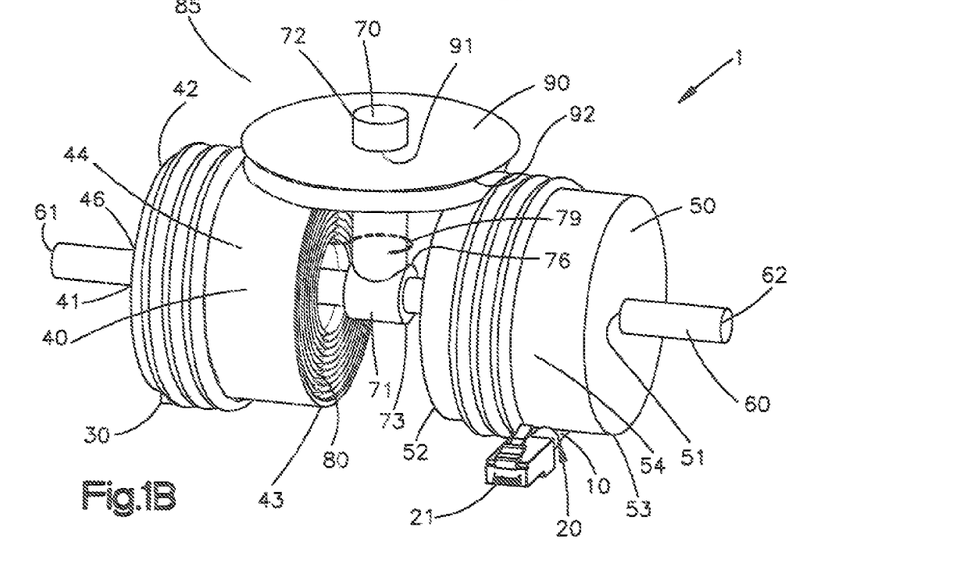
FIG. 1B is a perspective view of the system shown in FIG. 1A in which the cable is coiled.
Figure 2:
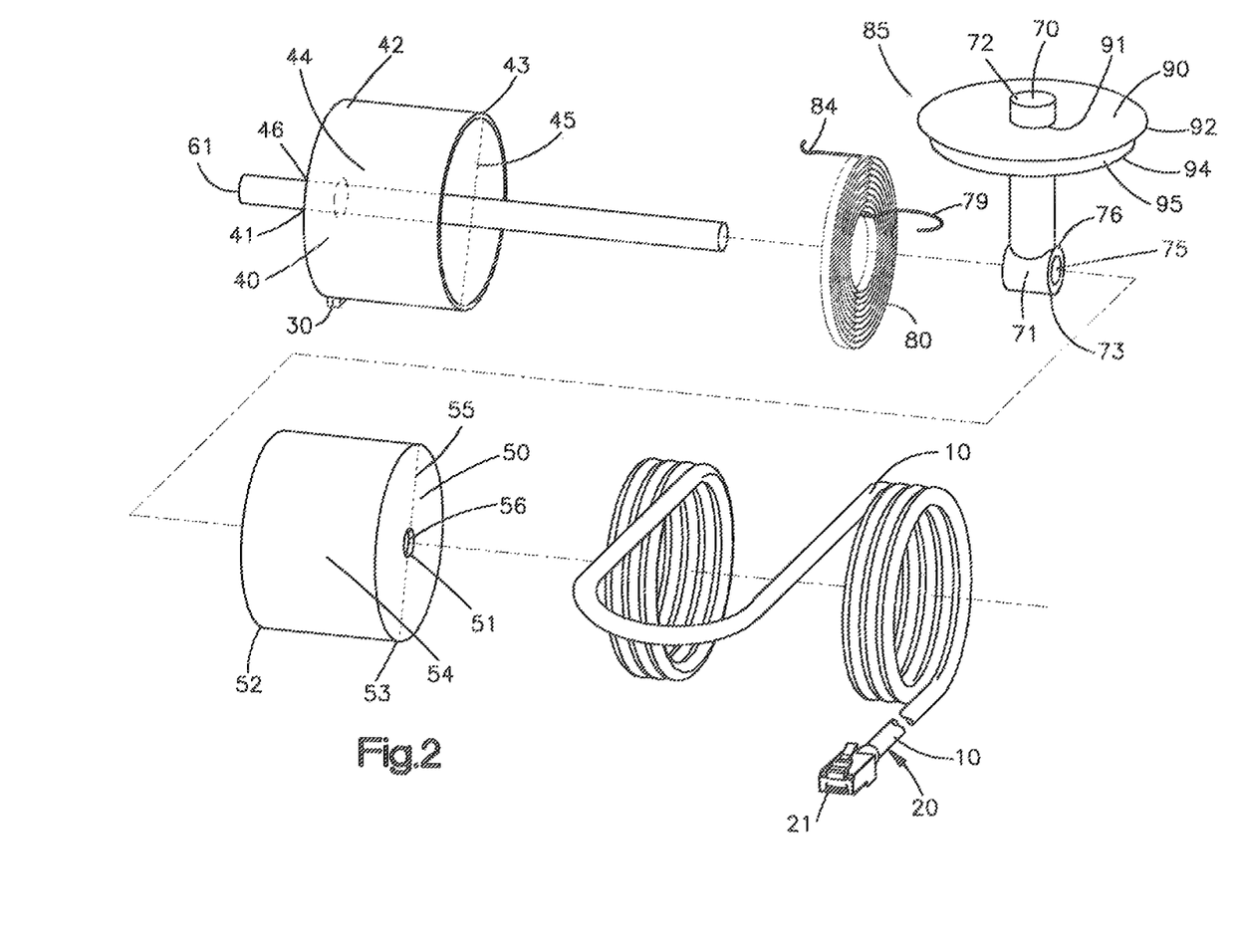
FIG. 2 is an exploded view of the system shown in FIG. 1B.
Figures 3A, 3B, 3C:
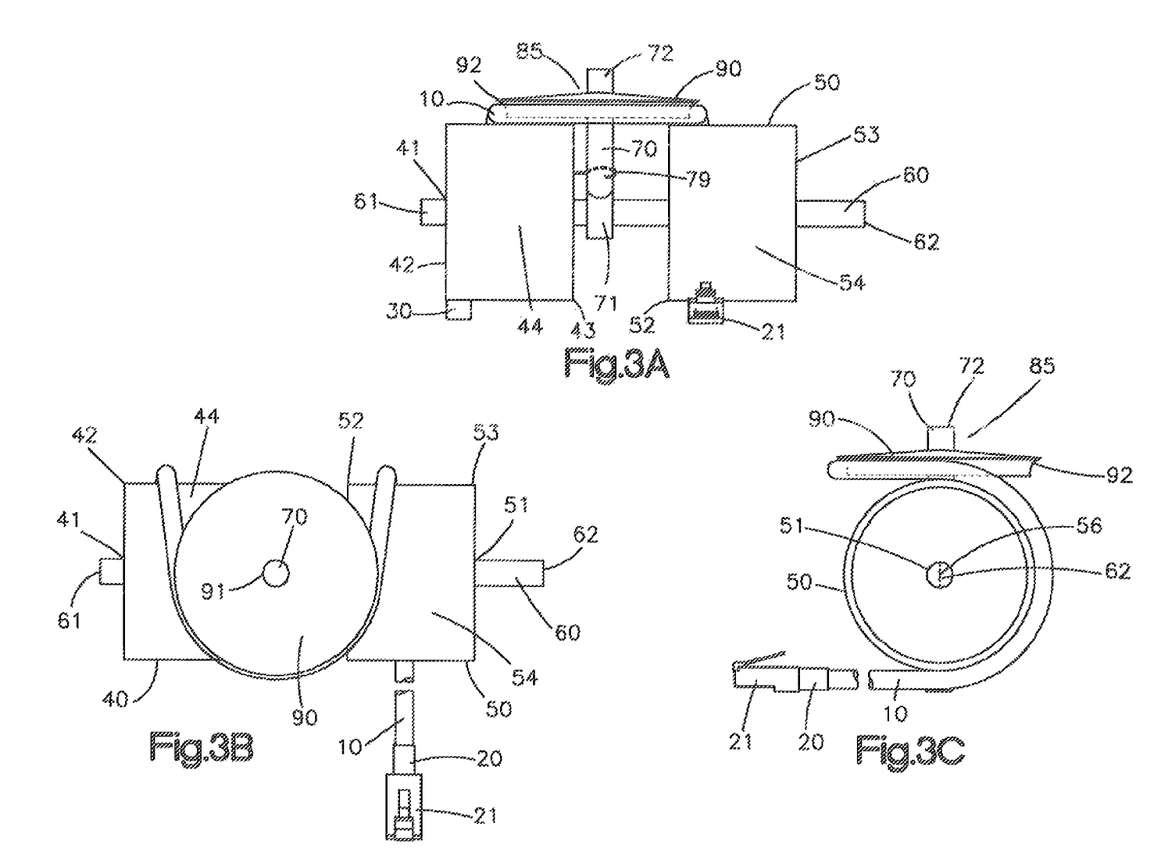
FIG. 3A is a front view of the system shown in FIG. 1A.
FIG. 3B is a top view of the system shown in FIG. 1A.
FIG. 3C is a side view of the system shown in FIGS. 1A-B.

The system 1 preferably includes a first drum 40, a second drum 50, an axle 60, and a shaft-pulley assembly 85. The shaft-pulley assembly 85 preferably includes a shaft 70 and a pulley 90. The first and second drums 40, 50 may each be substantially cylindrical. The first drum 40 may include an aperture 41 formed therein, a first end 42, a second end 43, and an outer diameter 45. The aperture 41 includes an inner diameter 46 (similar to an inner diameter 56 of the second drum, as shown in FIGS. 2, 3C). In addition, the second drum 50 may include an aperture 51, a first end 52, a second end 53, and an outer diameter 55. The aperture 51 includes an inner diameter 56. The outer diameter 45 of the first drum 40 may be approximately equal to the outer diameter 55 of the second drum 50. The aperture 41 extends at least partially from the first end 42 of the first drum 40 to the second end 43 of the first drum 40. Likewise, the aperture 51 extends at least partially from the first end 52 of the second drum 50 to the second end 53 of the second drum 50. The apertures 41, 51 may be configured such that an axle 60 may pass through the apertures 41, 51 and extend centrally from at least the first end 42 of the first drum 40 to the second end 53 of the second drum 50. The distance between the respective outer diameter 45, 55 and the inner diameter 46, 56 may be substantially hollow. A spring 80 may nest within the first drum 40 between the outer diameter 45 and the inner diameter 46. In other embodiments, the distance between the outer diameter 45 and the inner diameter 46 of the first drum 40 and/or the outer diameter 55 and the inner diameter 56 of the second drum 50 may be solid or partially solid.

The axle 60 may include a first end 61 and a second end 62. The axle 60 may be a substantially cylindrical rod. The axle 60 may pass through the aperture 41 of the first drum 40 and may pass through the aperture 51 of the second drum 50. The first drum 40 may be positioned on the first end 61 of the axle 60, and the second drum 50 may be positioned on the second end 62 of the axle 60. The first drum 40 may be configured to be fixed or stationary on the axle 60, and the second drum 50 may be configured to rotate around the axle 60. That is, the first drum 40 is preferably non-rotatably coupled to the first end 61 of the axle 60 while the second drum 50 is rotatably coupled to the second end 62 of the axle 60. In addition, the second drum 50 may be configured to traverse or slide along at least part of the length of the axle 60. In this embodiment, the first drum 40 is shown as a separate component that is configured to be fixed to the axle 60; however in other embodiments, the first drum 40 and the axle 60 may be an integrated component. In some embodiments, the second drum 50 may be configured to act as an idler pulley. In other embodiments, the outer surface of the axle 60 and/or the aperture 51 of the second drum 50 may be threaded or include one or more grooves. The one or more grooves may be interlocking engagement grooves, such as a helical groove, a spiraled groove, etc.

The shaft-pulley assembly 85 may include a shaft 70 coupled to a pulley 90. The shaft 70 may include a first end 71 and a second end 72. The first end 71 of the shaft 70 may have a collar 76 having an outer diameter 73 and an aperture 75 formed therein. Preferably, the collar 76 has a circular or cylindrical shape. The axle 60 may pass through the aperture 75. The shaft 70 may be positioned on the axle 60 between the first drum 40 and the second drum 50. The shaft 70 may be adapted and configured to rotate around the axle 60, and may also be adapted and configured so that the shaft 70 can slide or traverse along at least part of the length of the axle 60. The second end 72 of the shaft 70 may be configured to pass through an aperture 91 formed in the pulley 90.

The pulley 90 may have a substantially circular circumference and an aperture 91 formed therein approximately at the center of the pulley 90. The second end 72 of the shaft 70 may be configured to pass through the aperture 91, and the pulley 90 may be configured to rotate around the shaft 70. In some embodiments, the second end 72 of the shaft 70 may include spiral threads. It will be understood by one of ordinary skill in the art that at least the width of the collar 76 at the first end 71 of the shaft 70 may be widened to prevent the shaft from wobbling.

The pulley 90 may include a first lip 92 and a second lip 94 around the outer circumference of the pulley, the first and second lips 92, 94 defining a groove 95 in the outer circumference of the pulley 90 for seating a portion of the cable 10 therein. In an embodiment, the first lip 92 may extend beyond the second lip 94. The pulley 90 may be configured so that the cable 10 may align around a portion of the pulley 90.

The shaft-pulley assembly 85 may be configured to rotate around the axle 60. That is, in use, the shaft 70 and the pulley 90 rotate around the axle 60. The spring 80 may be coupled to the shaft 70, and may torque the shaft 70 around the axle 60. In this exemplary embodiment, the spring 80 includes a first end 79 and a second end 84, the first end 79 being configured to couple to the shaft 70, and the second end 84 being configured to couple to an inner portion of the first drum 40. The first end 79 may be configured to couple to the shaft 70 at any point along the length of shaft 70, and the second end 84 may be configured to couple to any point of the first drum 40, but preferably at the point that the second end 30 of the cable 10, or a portion of the cable 10 adjacent to the second end 30, is securely attached to the first drum 40. The cable system 1 may be configured such that a cable 10 may wrap around at least a portion of the first drum 40, at least a portion of the pulley 90, and at least a portion of the second drum 50. The cable 10 may include a first end 20 and a second end 30. The first end 20 of the cable 10 may include a connector 21 that is adapted and configured to be plugged into a device or component (not shown). The second end 30, or a portion of the cable 10 adjacent to the second end 30, may be fixed so that it is securely attached to the first drum 40 (see also FIG. 7). For example, the second end 30 may include a component 31, such as but not limited to, a clamp, restraint, strain relief, grip, gripping adapter, clip, housing, etc., to anchor or fix the second end 30 of the cable 10, or a portion of the cable 10 adjacent to the second end 30, to the first drum 40. The second end 30, or a portion of the cable 10 adjacent to the second end 30, may be adapted and configured to be anchored, fixed, or securely attached to the first drum 40 so that when the cable 10 is fully uncoiled from the drum, retraction of the cable 10 from the cable system 1 is stopped by way of the component 31 which fixedly anchors or securely attaches the second end 30, or a portion of the cable 10 adjacent to the second end 30, to the first drum 40, thereby preventing the cable 10 from being pulled out of the cable system 1 and/or the wall (not shown). In some embodiments, the component 31 may be integral with the first drum 40.

Figure 7:
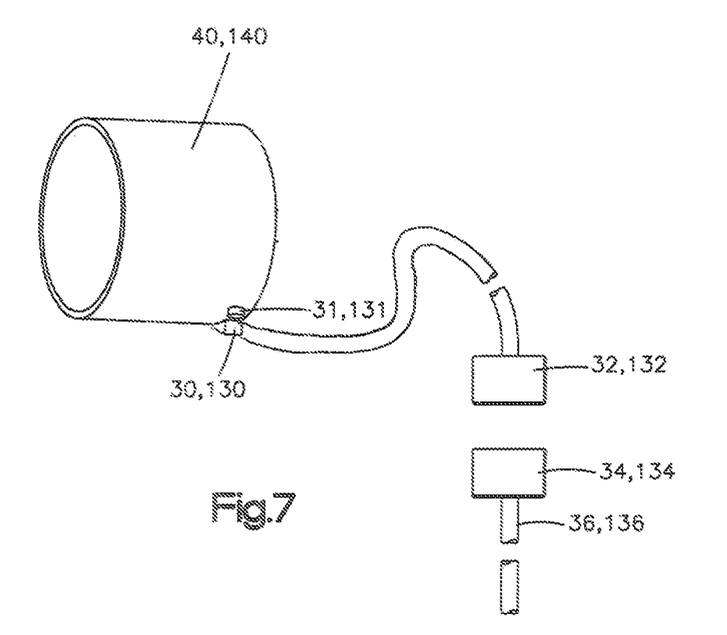
FIG. 7 is a detailed view of a fixed end of the cable of the embodiments of FIGS. 1A and 4A coupled to a horizontal link.

Referring to FIG. 7, the cable 10 may extend outward and away from the fixed second end 30 of the cable system 1 and be coupled to a horizontal link 36, such as but not limited to, structured cabling, a component structurally integral and fixed to the building structure, etc. The second end 30 may be coupled to the horizontal link 36 by any means now or hereafter known in the art, such as but not limited to, a connector 32 on such extending end of the cable 10, and a complementary connector 34 of the horizontal link 36.

In use, as best illustrated in FIGS. 1A-B and 3A-C, when the cable 10 is being coiled or retracted, the axle 60 and the first drum 40 are fixed or stationary. The second drum 50 rotates around the axle 60 in a counter-clockwise direction, and the shaft-pulley assembly 85 rotates around the axle 60 in a counter-clockwise direction, with the second drum 50 preferably rotating at a rate approximately two times faster than that of the shaft-pulley assembly 85. The pulley 90 may rotate around the shaft 70. The spring 80 may act as a pulley and force the shaft-pulley assembly 85 to rotate in a counterclockwise direction around the axle 60, at least until the cable 10 is payed or coiled onto the first and second drums 40, 50, respectively. When the cable 10 is being coiled, the cable 10 approaches the second drum 50 from the direction of the first end 20 of the cable 10. The cable 10 begins to wrap around the second drum 50, preferably approximately in the center of the second drum 50. The cable 10 wraps around the second drum 50 and then changes direction when it enters the groove 95 of the pulley 90 in such a manner to prevent undue twist, torque or tension on the cable 10 and preserve the structural integrity of the cable 10. As the cable 10 coils or retracts, it may wrap around the outer surfaces 44, 54 of the first and second drums 40, 50, respectively. The cable 10 coils on, and accumulates around, the drums 40, 50 preferably towards the direction of the second ends 43, 53 of the drums, respectively. The cable 10 preferably coils on the first and second drums 40, 50 such that there is only one layer of cable on each of the drums 40, 50. The second drum 50 preferably traverses across at least part of the length of the axle 60 as the cable 10 is being coiled onto the second drum 50 such that when the cable 10 is fully retracted into the cable system 1, there is only a single layer of cable on each of the drums 40, 50. The second drum 50 preferably rotates approximately two times the rate at which the cable 10 is coiled or accumulates onto the fixed first drum 40. The second drum 50 may be configured to act as an idler pulley, and may be configured to guide the cable, take up cable slack, and/or regulate the manner in which the cable 10 pays out of the shaft-pulley assembly 85. The relative diameters of the pulley 90 and the first and second drums 40, 50 are such that the pulley 90 and the second drum 50 preferably rotate at a rate two times faster than the rate at which the cable 10 coils or accumulates onto the fixed first drum 40. The cable system 1 allows the cable 10 to coil around the drums 40, 50 with little or no torsional stress or bending, while maintaining geometric control of the cable 10. In some embodiments, a cable release clamp (not shown) may be affixed, by way of example, on a wall plate or surface mount device, to control the cable 10 when it is being retracted or coiled.

When the cable 10 is fully coiled (see FIG. 1B), the outer surface 44 of the first drum 40 and the outer surface 54 of the second drum 50 preferably each hold approximately equal lengths of the cable 10. In some embodiments, the outer surface 44 and/or the outer surface 54 may include one or more grooves such that the cable 10 is positioned within the grooves on the outer surfaces 44, 54. The one or more grooves may be interlocking engagement grooves such as, but not limited to, a helical groove, a spiraled groove, etc. In other embodiments, drum guards (e.g., drum guard 196 in FIG. 4A) may be included on the first end 42 of the first drum 40 and/or the second end 53 of the second drum 50 to prevent the cable 10 from sliding of the ends of the respective drums 40, 50. In addition, tension guards (not shown) may be provided to prevent the cable 10 from losing tension.

When the cable 10 is being uncoiled, or payed out, from cable system 1, a user may pull the first end 20 of the cable 10 in a direction away from the cable system 1. The second drum 50, in turn, rotates in a clockwise direction around the axle 60 and the shaft-pulley assembly 85 rotates in a clockwise direction around the axle 60. The second drum 50 preferably rotates at a rate approximately two times faster than that of the shaft-pulley assembly 85. Moreover, as the first drum 40 is stationary and the second drum 50 rotates around the axle 60 during uncoiling of the cable 10, the second drum 50 preferably rotates at a rate approximately two times faster than the rate at which the first drum 40 winds up or coils the cable 10. The cable 10 uncoils around the outer surface 44 of the first drum 40 and the outer surface 54 of the second drum 50. The cable 10 may be payed out or uncoiled until the cable is fully uncoiled, and further uncoiling is stopped by way of the second end 30, or a portion of the cable 10 adjacent to the second end 30, being fixedly anchored or securely attached to the first drum 40, or the user stops uncoiling the cable.

When the cable 10 is being uncoiled, the cable 10 approaches the second drum 50 from the direction of the shaft-pulley assembly 85. Without twisting or torqueing the cable 10, the shaft-pulley assembly 85 and the second drum 50 change the direction of the cable 10 as the cable comes off the system 1. The second drum 50 may be configured to act as an idler pulley, and may help regulate the tension applied onto the cable 10. As appreciated by one of ordinary skill in the art, the amount of tension on the cable is critical in some cabling applications where maintenance of structural integrity of the cable is important (e.g. copper cables, fiber cables, data cables, etc.).

As the cable 10 is uncoiled, or payed out, of the cable system 1, the first drum 40 and second drum 50 are drawn closer and closer together along at least part of the length of the axle 60 until the cable 10 is fully uncoiled, or payed out. When the cable 10 is fully uncoiled or payed out, the first drum 40 and the second drum 50 are preferably adjacent one another, and in the closest proximity to one another along the axle 60, than at any other point of coiling or uncoiling the cable 10 from the cable system 1.

When the cable 10 is fully uncoiled, the cable 10 is preferably wrapped a fraction of one time around the first drum 40, aligned around a portion of the groove 95 of the pulley 90, and wrapped a fraction of one time around the second drum 50. When uncoiled, the cable 10 that is wrapped on the first drum 40 is preferably positioned towards the first end 42 of the first drum 40 which allows the cable 10 to creep to the right onto the first drum 40 when the cable 10 retracts. When the cable 10 is being coiled, the cable 10 approaches the second drum 50 from the direction of the first end 20 of the cable. As the cable 10 coils, it may wrap around each of the outer surfaces 44, 54 of the first and second drums 40, 50, respectively. When the cable 10 is fully coiled, the cable 10 is wrapped one or more times around the first drum 40, aligned around a portion of the groove 95 of the pulley 90, and wrapped one or more times around the second drum 50.

In some embodiments, a flange (not shown) may extend radially outward from the second end 62 of the axle 60 to prevent the second drum 50 from coming off of the axle 60 as the second drum 50 traverses at least a part of the length of the axle 60. In other embodiments, the shaft 70 may include a flange (not shown) extending radially outward from the outer diameter of the second end 72 of the shaft 70 to prevent the pulley 90 from coming off the shaft 70.

It will be understood by one of ordinary skill in the art that the cable system 1 can be scaled to size. Some factors that may affect the scaling of the overall cable system 1 and/or one or more of the system components include, but are not limited to, the type of cables, the length of cables, the diameter of the cables, the cabling application, etc. In one exemplary, non-limiting embodiment, the diameter of the cable 10 may be approximately one-eighth inch, and the first drum 40, the second drum 50, and the pulley 90 may each have a preferable diameter of approximately one to two inches. However, it will be appreciated by one of ordinary skill in the art that the drums 40, 50 and/or the pulley 90 may be adapted to accept varying sizes (e.g. diameter, length, etc.) of cable. The smaller the diameter of the drums 40, 50, the longer the drums 40, 50 may have to be to hold the same length cable 10. For example, if the drums 40, 50 have a diameter of one inch, then the drums 40, 50 would have to be at least two times longer than if the drums 40, 50 have a two inch diameter (assuming the same length cable 10 is to be used). Furthermore, it will be appreciated by one of ordinary skill in the art that the cable 10 may be comprised of cables of variously sized diameters.

FIGS. 4A-F show another embodiment of a cable system 500. The cable system 500 shown in this embodiment is substantially identical to the first embodiment of the cable system 1 shown in FIGS. 1A-3C, 7, except for the following distinctions. The second drum 150 is preferably approximately two times the length of the first drum 140. With the greater length of the second drum 150, there is a larger outer surface area 154 available on the second drum 150 for the cable 100 to wrap around as the cable 100 uncoils and/or coils on the drums 140, 150. When the cable 100 is fully coiled on the cable system 500, preferably approximately the same amount of cable 100 is wrapped around each of the first and second drums 140, 150. More specifically, when the full length of the first drum 140 is filled or wrapped with the cable 100, the second drum 150 is preferably approximately half filled or wrapped with the cable 100, with the cable 100 wrapped on the second drum 150 positioned towards the first end 152.

A shaft-pulley assembly 185 may include a shaft 170 coupled to a pulley assembly 190. The pulley assembly 190 may include a pulley shroud 194 and a pulley 195. The pulley shroud 194 may be configured to affix to the second end 172 of the shaft 170. The pulley 195 may include an aperture 191. The second end 172 of the shaft 170 may be configured to pass through the aperture 191. The pulley shroud 194 and the pulley 195 may further include a first lip 192 and a second lip 193, first and second lips 192, 193 defining a groove 197 in the outer circumference of the pulley shroud 194 and the pulley 195 for seating a portion of the cable 100 therein. The pulley 195 may have a substantially circular shape that is at least partially covered by the pulley shroud 194. The shaft-pulley assembly 185 may be configured to rotate around the axle 160, and the pulley 195 may be configured to rotate around the shaft 170. The pulley shroud 194 may be configured to rotate around the axle 160, but the pulley shroud 194 does not rotate around the shaft 170.

Figure 4A:
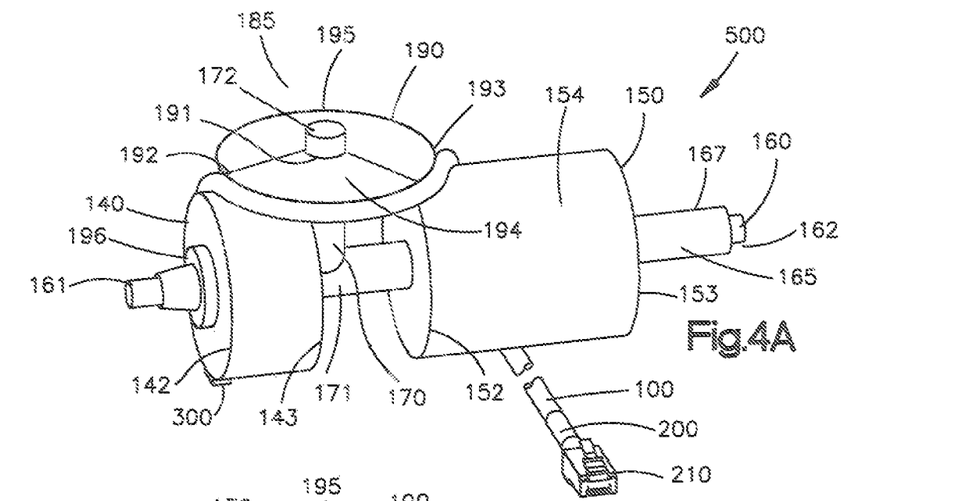
FIG. 4A is a perspective view of another exemplary embodiment of a system in which a cable is uncoiled.
Figure 4B:
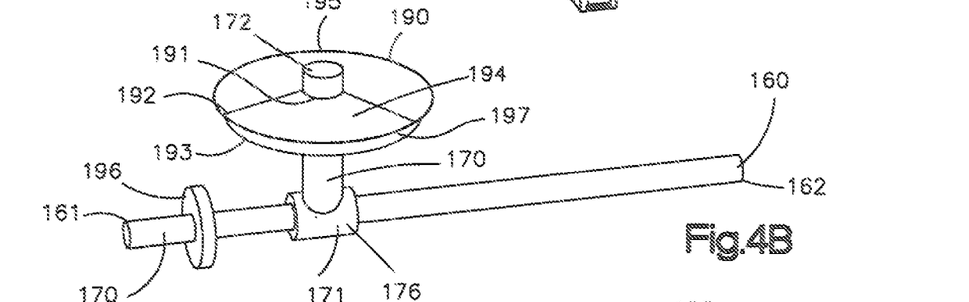
FIG. 4B is a view of a shaft-pulley assembly of the system shown in FIG. 4A.
Figures 4C, 4D:
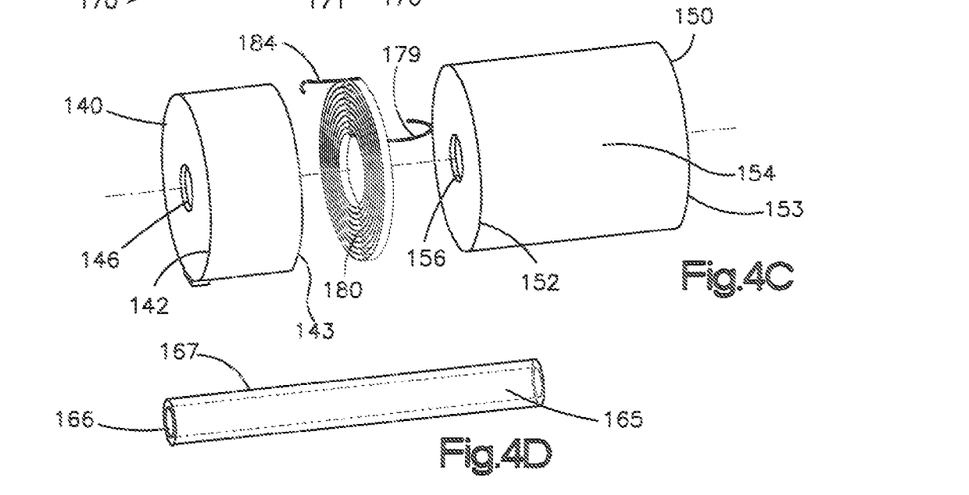
FIG. 4C is a view of a first drum, a second drum, and a spring of the system shown in FIG. 4A.
FIG. 4D is a view of a bushing of the system shown in FIG. 4A.
Figure 4E:
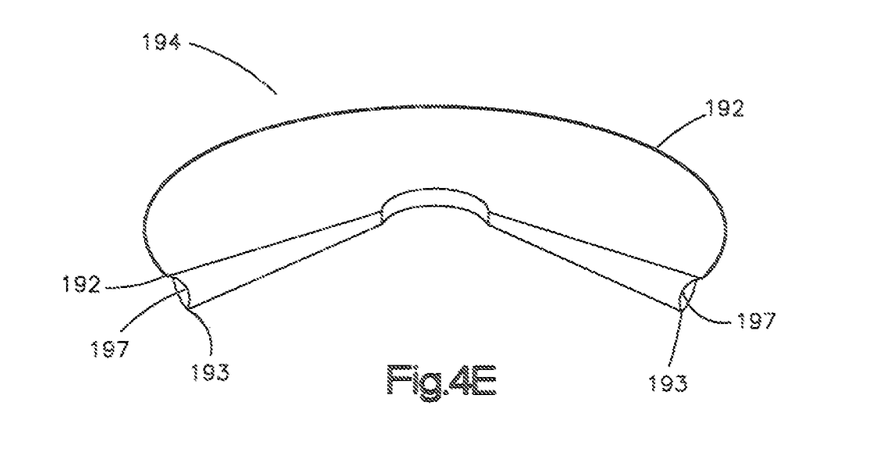
FIG. 4E is a view of a pulley shroud of the system shown in FIG. 4A.
Figure 4F:
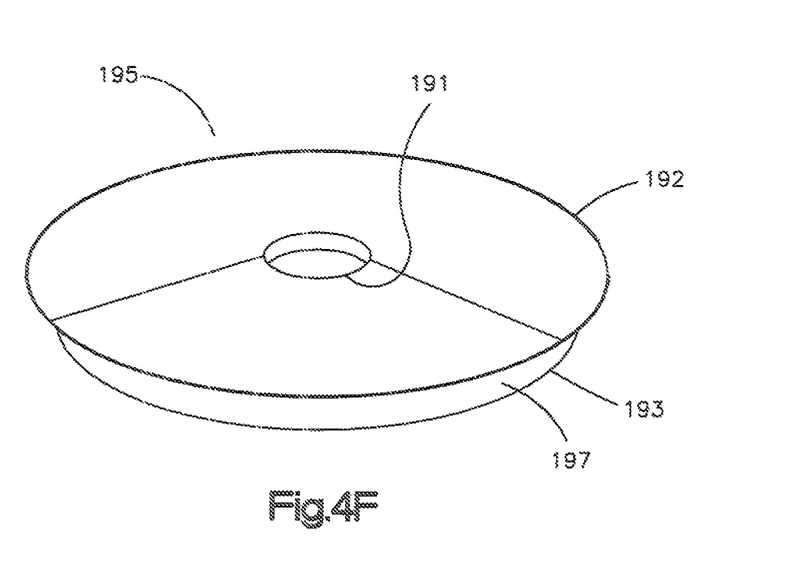
FIG. 4F is a view of a pulley of the system shown in FIG. 4A.

The cable system 500 may further include a bushing 165 as best illustrated in FIGS. 4A and 4D. The bushing 165 preferably includes an aperture 166 and an outer surface defined at least in part by an outer diameter 167. In use, the axle 160 is inserted into the aperture 166 of the bushing 165 so that the bushing 165 extends longitudinally along at least part of the length of the axle 160. The collar 176 at the first end 171 of the shaft 170 may be configured to pass over the bushing 165. In addition, the bushing 165 may be configured to pass through the aperture 146 of the first drum 140 and the aperture 156 of the second drum 150. The bushing 165 may be configured to rotate around the axle 160. In some embodiments, one or more ends of the bushing 165 may include a flange (not shown) extending radially outward from the outer diameter 167 of the bushing 165.

A flange or drum guard 196 may extend radially outward from the first end 161 of the axle 160. In other embodiments, a flange or drum guard (not shown) may extend radially outward from the second end 162 of the axle 160 to prevent the second drum 150 from coming of the axle 160, as the second drum 150 traverses at least a part of the length of the axle 160. In other embodiments, the shaft 170 may include a flange or shaft guard (not shown) extending radially outward from the outer diameter of the second end 172 of the shaft 170 to prevent the pulley assembly 190 from coming off the shaft 170.

It will be understood by one of ordinary skill in the art that the second end 300 of the cable 100 shown in the embodiment of FIGS. 4A-D may further include the features of FIG. 7 including, but not limited to being a fixed end, as described herein.

Figure 5A:
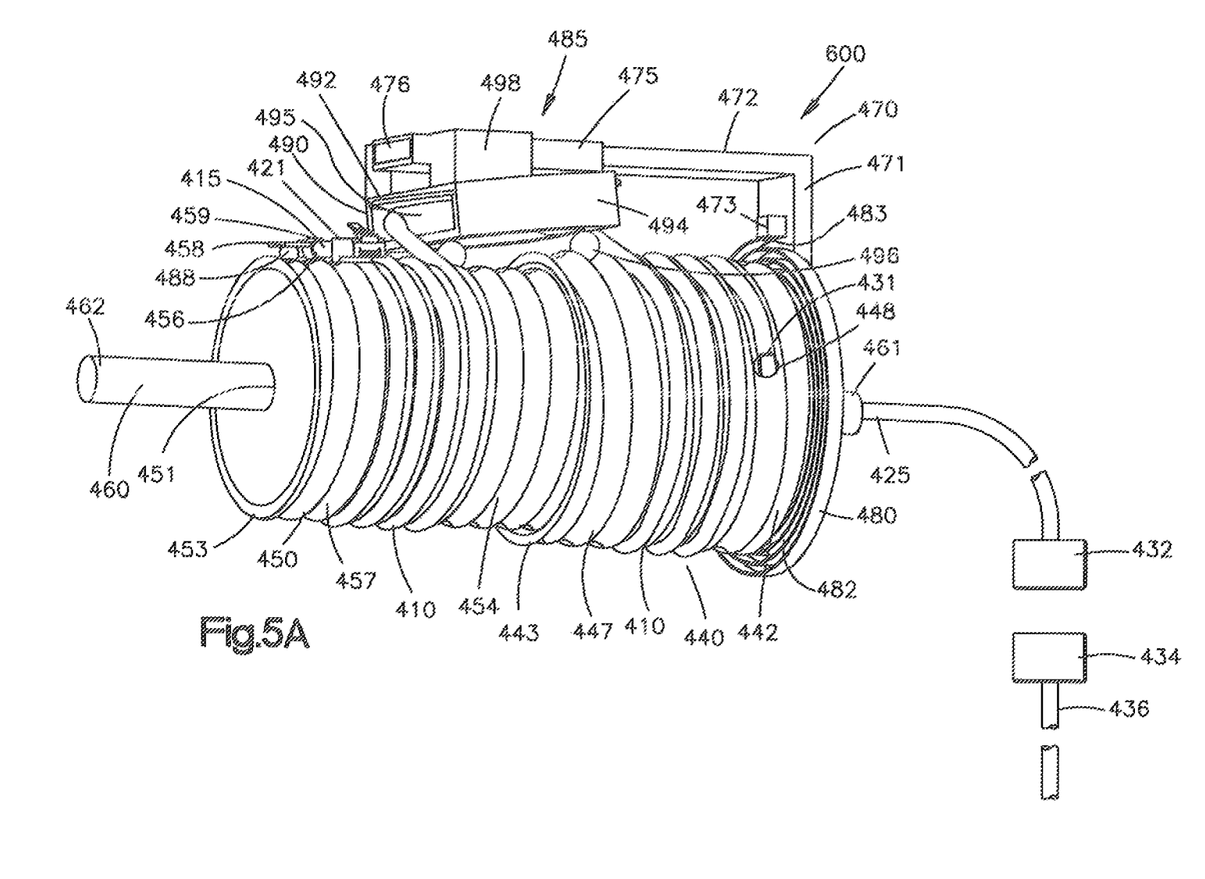
FIG. 5A is a perspective view of another exemplary embodiment of a system in which a cable is coiled.
Figure 5B:
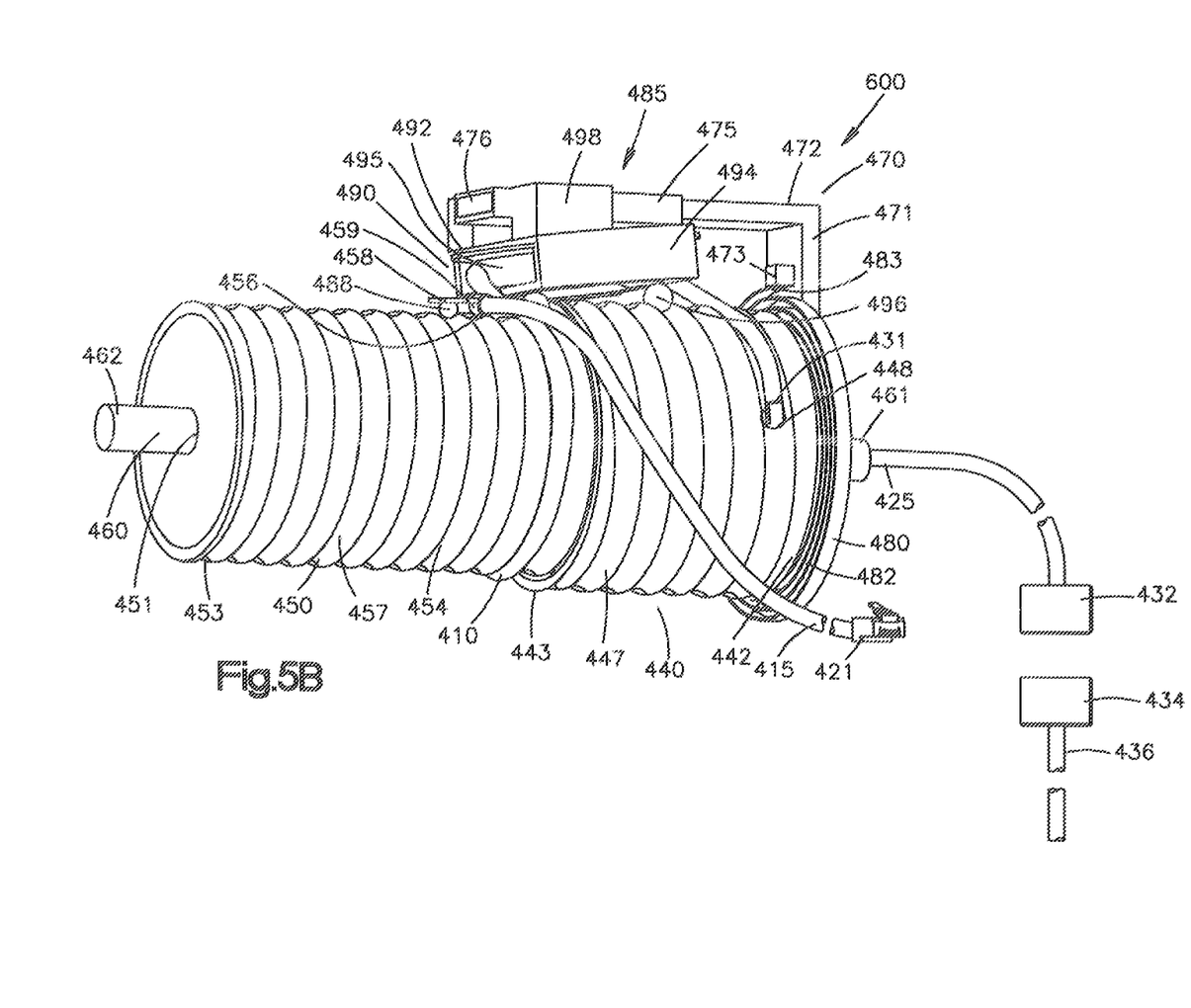
FIG. 5B is a perspective view of the system shown in FIG. 5A in which the cable is uncoiled.
Figure 6:
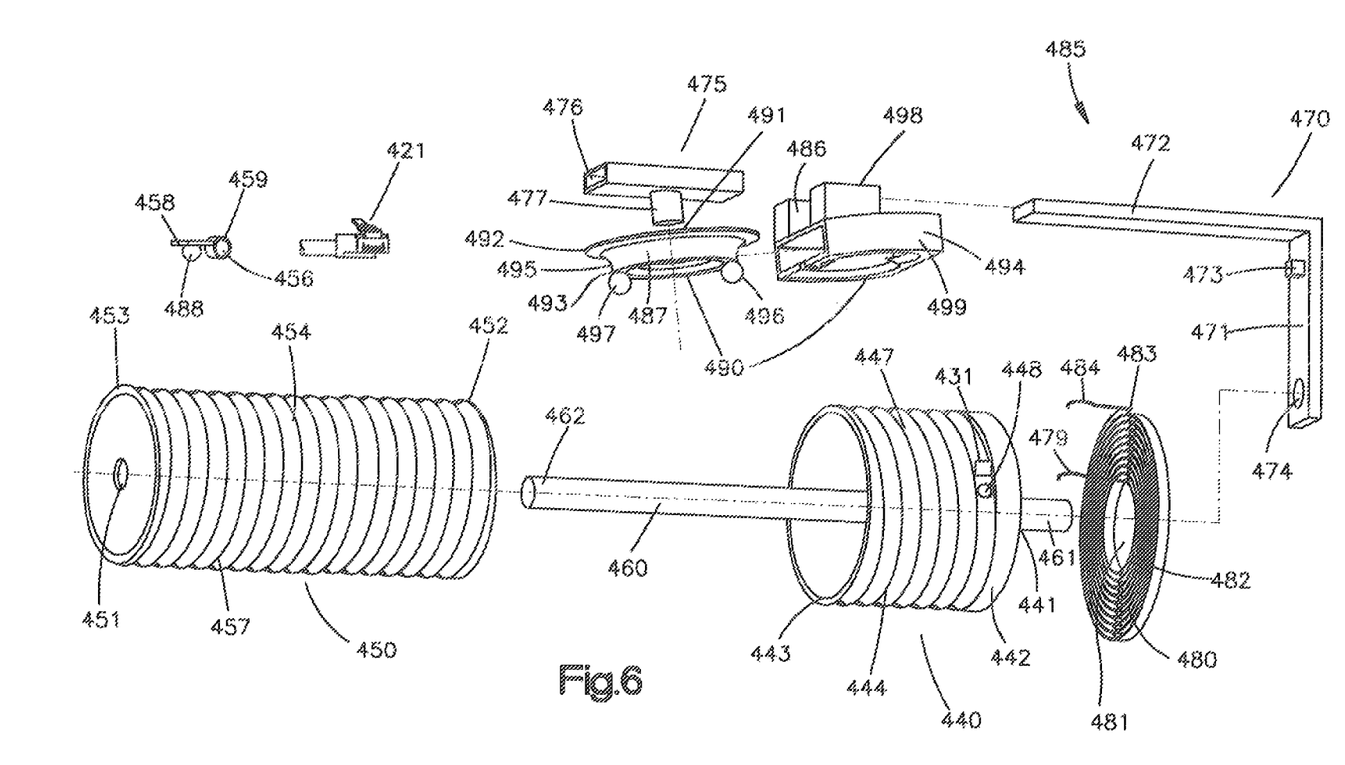
FIG. 6 is an exploded view of the system shown in FIGS. 5A-B.

FIGS. 5A-5B, 6 show a third exemplary embodiment of a cable system 600. The cable system 600 preferably includes a first drum 440, a second drum 450, an axle 460, a pulley-mounting assembly 485, and a spring 480. The pulley-mounting assembly 485 may include an arm 470, a slider 475, and a pulley assembly 490 having a pulley shroud 494 and a pulley 495.

Similar to the embodiments discussed above, the cable system 600 is adapted and configured for a cable 410 to be coiled and uncoiled in a manner that puts little or no torsional stress, twisting, and/or bending force on the cable 410, while controlling the bend radius and geometry of the cable 410.

The first drum 440 and the second drum 450 are substantially cylindrical, in which the first drum 440 preferably has a larger diameter than the second drum 450, and the second drum 450 preferably has a longer length than the first drum 440. In some embodiments, the second drum 450 preferably is at least two times the length of the first drum 440. The first drum 440 may include a first end 442, a second end 443, an outer surface 444, and an aperture 441. The second drum 450 may also include a first end 452, a second end 453, an outer surface 454, and an aperture 451. The first drum 440 is preferably adapted and configured for the first end 452 of the second drum 450 to at least partially nest within the second end 443 of the first drum 440. As such, the first drum 440 may be substantially hollow, and the second drum 450 may be hollow or solid. The first drum 440 may include an aperture 441 positioned approximately in the center of the first drum 440, and the second drum 450 may include an aperture 451 positioned approximately in the center of the second drum 450. The apertures 441, 451 are adapted and configured for the axle 460 to pass through the apertures 441, 451.

The axle 460 may include a first end 461 and a second end 462. The axle 460 may be a substantially cylindrical rod. The first end 461 may pass through the aperture 441 of the first drum 440, and the second end 462 may pass through the aperture 451 of the second drum 450. The first drum 440 is adapted and configured to be fixed or stationary on the axle 460, and the second drum 450 is adapted and configured to rotate around the axle 460. That is, the first drum 440 is preferably non-rotatably coupled to the first end 461 of the axle 460, while the second drum 450 is rotatably coupled to the second end 462 of the axle 460. In addition, the second drum 450 is adapted and configured to traverse or slide across at least part of the length of the axle 460. In some embodiments, the second drum 450 may be configured to act as an idler pulley.

The first drum 440 may include one or more grooves 447, and the second drum 450 may include one or more grooves 457. The grooves 447, 457 may be one of various cross-sections or profiles (e.g. a helical groove, a spiraled groove, etc.). The grooves 447, 457 are adapted and configured for the cable 410 to be positioned within the grooves. Furthermore, the grooves 447, 457 are adapted and configured to interlock so that the second drum 450 may engage, nest, and rotate within the first drum 440.

The cable system 600 may further include a cable inlet bushing 459 and a groove follower 458. The cable inlet bushing 459 may include an opening 456 through which the cable 410 passes through. The follower 458 may include a ball 488. The follower 458 is adapted and configured so that the ball 488 rides in at least one of the plurality of grooves 447, 457.

The bushing cable inlet 459 and the follower 458 help the cable 410 to align with the grooves 447, 457 when the cable 410 is being coiled and uncoiled to prevent the cable 410 from cross-threading or jamming. The cable inlet bushing 459 and follower 458 are attached to and guided by a slot (not shown) positioned on the second drum 450. The cable inlet bushing 459, the follower 458, and the ball 488 move together in a lateral direction generally parallel to the axle 460. In other embodiments, the cable inlet bushing 459 and the follower 458 may further include a lateral guide (not shown), which may be generally parallel to the axle 460 and/or which may include a shell.

The arm 470 of the pulley-mounting assembly 485 may include a first side 471 and a second side 472. The first side 471 may be substantially perpendicular to the second side 472. The first side 471 may include a protrusion 473 and an aperture 474. The aperture 474 is adapted and configured for the first end 461 of the axle 460 to pass through, and the protrusion 473 is adapted and configured to engage a portion of a spring 480. The spring 480 may include an aperture 481 formed therein which is adapted and configured for the first end 461 of the axle 460 to pass through. That is, the first end 461 of the axle 460 may pass through the aperture 481 formed in the spring 480 and the aperture 474 formed in the arm 470. The swing 480 may be positioned on the axle 460 between the first drum 440 and the first side 471 of the arm 470. An inner side 482 of the spring 480 may attach to the first drum 440, and an end 483 of the spring 480 may attach to the protrusion 473. The spring 480 may torque the arm 470 around the axle 460.

The slider 475 of the pulley-mounting assembly 485 may include an aperture 476 and a knob 477. The aperture 476 may extend the length of the slider 475 so that the second side 472 of the arm 470 may pass through the aperture 476. The slider 475 is preferably adapted and configured to traverse along the length of second side 472 of the arm 470. The pulley assembly 490 may include a pulley shroud 494 and a pulley 495. The pulley 495 may be adapted and configured to rotate around the knob 477. The pulley shroud 494 may include a mounting portion 498 and a receiving portion 499. The mounting portion 498 is adapted and configured to couple to the slider 475. The receiving portion 499 is adapted and configured to receive at least a portion of the pulley 495. An aperture 486 is formed within the pulley shroud 494, in which the aperture 486 is adapted and configured for the knob 477 to pass through. In this embodiment, the receiving portion 499 is substantially hollow so that the pulley 495 extends fully through the receiving portion 499, with portions of the pulley 495 being exposed on each side of the receiving portion 499. However, in other embodiments, the receiving portion 499 may be configured so that only a portion of the pulley 495 extends into the receiving portion 499. The pulley 495 may include an aperture 491, a first lip 492 and a second lip 493. The first and second lips 492, 493 defining a groove 487 in the outer circumference of the pulley for seating a portion of the cable therein. The knob 477 is adapted and configured to pass through the aperture 491. The pulley 495 may be substantially circular or disc-shaped, and may be at least partially covered by the pulley shroud 494. The pulley 495 may be further configured to rotate around the knob 477. Balls 496, 497 may be configured to roll against or on the pulley 495 and/or the pulley shroud 494. In addition, the balls 496, 497 are configured to be guided by and ride within the grooves 447, 457 of the first drum 440 and/or the second drum 450. When assembled, the pulley assembly 490 may be positioned at an angle to assist the cable 410 in transitioning from the pulley assembly 490 to the drums 440, 450. The pulley-mounting assembly 485 may be configured to rotate around the axle 460.

The cable system 600 may be configured so that the cable 410 may wrap around at least a portion of the pulley assembly 490 and at least a portion of the first and/or second drum 440, 450. The cable 410 may include a first end 415 and a second end 425. The first end 415 may include a connector 421 that is adapted and configured to be plugged into a device or component (not shown), and the second end 425, or a portion of the cable 410 adjacent to the second end 425, is anchored, fixed or securely attached to the first drum 440. Preferably, the second end 425 may be configured to feed into an opening 448 formed in the outer surface 444 of the first drum 440 and feed into and exit from the first end 461 of the axle 460.

The second end 425 of the cable 410, or a portion of the cable 410 adjacent to the second end 425, may be configured to be anchored, fixed or securely attached to the first drum 440 so that when the cable 410 is fully uncoiled from the spool, the cable 410 is prevented from being pulled out of the cable system 600 and/or the wall. In addition, the second end 425 of the cable 410, or a portion of the cable 410 adjacent to the second end 425, may include a component 431 (similar to the component 31, 131 as shown in FIG. 7) such as, but not limited to, a clamp, a restraint, a strain relief, a grip, a gripping adapter, a clip, a housing, etc., to anchor or fix a portion of the second end 425 of the cable 410, or a portion of the cable 410 adjacent to the second end 425, at the opening 448. That is, the second end 425 of the cable 410, or a portion of the cable 410 adjacent to the second end 425, may be fixed or securely attached to an outer portion of the drum 440 at or near the opening 448 (as shown in FIGS. 5A-B) or an inner portion of the drum 440 at or near the opening 448. In some embodiments, the component on the second end 425 of the cable 410, or a portion of the cable 410 adjacent to the second end 425, may be integral with the first drum 440.

The cable 410 may extend outward and away from the fixed second end 425 of the cable system 600 and be coupled to a horizontal link 436, such as but not limited to structured cabling, a component structurally integral and fixed to the building structure, etc. The second end 425, or a portion of the cable 410 adjacent to the second end 425, may be coupled to the horizontal link 436 by any means now or hereafter known in the art, such as but not limited to, a connector 432 on such extending end of the cable 410, and a complementary connector 434 of the horizontal link 436.

FIG. 5A depicts the cable system 600 when the cable 410 is coiled, and FIG. 5B depicts the cable system 600 when the cable 410 is uncoiled. In use, the axle 460 and the first drum 440 are fixed or stationary. That is, the axle 460 and the first drum 440 do not rotate during coiling and uncoiling of the cable 410. When the cable is being coiled, the second drum 450 rotates around the axle 460 in a counter-clockwise direction, and the pulley-mounting assembly 485 rotates around the axle 460 in a counter-clockwise direction, with the second drum 450 preferably rotating at a rate approximately two times faster than the pulley-mounting assembly 485 rotates. The spring 480 is adapted and configured to torque the pulley-mounting assembly 485 to rotate in a counter-clockwise direction around the axle 460 at least until the cable 410 is payed on or coiled onto the first and second drums 440, 450. The cable 410 approaches the second drum 450 from the direction of the first end 415 of the cable 410. The cable 410 feeds through an opening 456 in the cable inlet bushing 459 and coils around the second drum 450. The cable 410 feeds into the pulley assembly 490 around at least a portion of the grooves 487, and coils around the first drum 440. The cable 410 changes direction when it enters the pulley assembly 490 in a manner such that the cable does not twist and compromise signal integrity. The cable 410 preferably coils onto the first drum 440 from the direction of the second end 443 towards the first end 442 of the drum. The cable 410 may then feed into the opening 448 on the outer surface 444 of the first drum 440, and feed into and exit the first end 461 of the axle 460.

As the cable 410 is being coiled, the second drum 450 may traverse across at least part of the length of the axle 460 and rotate around the axle 460. In addition, the slider 475 may traverse across the second side 472 of the arm 470, and the pulley-mounting assembly 485 may rotate around the axle 460. The second drum 450 preferably rotates at a rate approximately two times faster than that of the cable 410 coiling on the fixed first drum 440. The second drum 450 may be configured to act as an idler pulley, and may be configured to guide the cable, take up cable slack, and/or regulate how the cable runs from the pulley-mounting assembly 485. The cable 410 coiled on the first drum 440 and the second drum 450 preferably rides in the grooves 447, 457. The cable 410 preferably coils onto the first and second drums 440, 450 so that there is only one layer of cable on the drums. The cable system 600 allows the cable 410 to coil onto the drums 440, 450 with little or no torsional stress or bending, while maintaining geometric control of the cable.

When coiled (see FIG. 5A), the first drum 440 and the second drum 450 may have approximately the same amount of cable coiled around their respective outer circumferences 444, 454. In addition, the second drum 450 may be at a position in which it is the most nested in the first drum 440. In some embodiments, guards, flanges, etc. may be included on the ends of the drums.

When the cable 410 is being uncoiled, the cable 410 may be pulled from the first end 415 in a direction away from the cable system 600. The second drum 450 preferably rotates in a clockwise direction around the axle 460, and the pulley-mounting assembly 485 preferably rotates around the axle 460 in a clockwise direction. The second drum 450 preferably rotates approximately two times faster than the pulley-mounting assembly 485 rotates. As the first drum 440 is stationary and the second drum 450 rotates, the second drum 450 runs at a rate approximately two times faster than the coiling occurring on the first drum 440. The second drum 450 may traverse across the axle 460, and the slider 475 may traverse across the second side 472 of the anti 470. The cable 410 may be payed out or uncoiled until the cable 410 is fully uncoiled, and further uncoiling is stopped by fixed attachment of the second end 425 of the cable 410, or a portion of the cable 410 adjacent to the second end 425, to the first drum 440, or until a user stops uncoiling the cable 410. The cable 410 travels from the direction of the first drum 440 towards the direction of the second drum 450. Without twisting or torqueing the cable 410, the drums 440, 450 and the pulley-mounting assembly 485 change the direction of the cable 410 as the cable feeds through and uncoils off the cable system 600. The second drum 450 may be configured to act an idler pulley, and may be configured to guide the cable, take up cable slack, and/or regulate the manner in which the cable 410 pays out of the pulley-mounting assembly 485.

When the cable 410 is fully uncoiled, the second drum 450 may be at a position in which it is the least nested in the first drum 440. In addition, the cable 410 may extend from an opening 448 on the outer surface 444 of the first drum 440, wrap at least a fraction of one time around the first drum 440, align around a portion of the pulley assembly 490, and wrap at least a fraction of one time around the second drum 450. In some embodiments, the cable may be wrapped one full time around the second drum when the cable is fully extended or uncoiled. In other embodiments, the cable system 600 may include a bushing (not shown), a flange (not shown), and/or a drum guard (not shown) on the axle. In addition, it will be understood by one of ordinary skill in the art that the system can be scaled to size.

The cable system 1, 500, 600 may be adapted and configured to be used in conjunction with all types of cabling including, but not limited to, communication and telecommunication cables. For example, copper patch cords, fiber patch cords, audio cords, video cords, audiovisual cords, USB cords, HDMI cords, headphone cords, Thunderbolt cords, Firewire cords, and cabling/cords for enterprise applications, data center applications, residential applications, telecommunications for high speed communications, etc.

The cable system 1, 500, 600 of the disclosed invention may be installed within a wall or other enclosure (not shown), and/or may be mounted to a wall box, wall stud or other member of a building structure or enclosure by means now or hereinafter known by one of ordinary skill in the art. An in-wall junction box and/or wall plate may be used in conjunction with the system to allow for interfacing with a wall and/or for receiving cabling so that the cable can be readily available to a user and minimal space in the wall is taken up. Overall, the disclosed cable system allows a type of pulley and weight system to be confined into a smaller volume, allowing the system to be more compact and practical. The system may be incorporated into as cable junction box, as described in U.S. Pat. No. 7,714,227, entitled "Cable Junction Box Configured to Store One or More Coils of Cable," the entire contents of which are herein incorporated by reference. Other features such as, but not limited to, a release clamp or face plate gripper, may be included in the system or on a wall plate or other enclosure to control the cable when it is coiled and uncoiled. In addition, a stop member may be included to prevent the cable from coiling or uncoiling.

The cable system according to the present disclosure is advantageous and meets the unfilled needs of many conventional systems. A cable can be coiled and stored without torsional stress, twisting, and bending, which allows the cable to maintain geometric control, bend radius control, structural integrity, and signal integrity; and, prevents degradation of the physical components of the cable. An additional advantage is that the system may be installed within a wall space or other enclosure so that it does not take up usable space in a room or building, while allowing a user to pull out only as much cable length as necessary for a particular application, thereby mitigating tripping hazards and tangling issues common with cables. Furthermore, the system makes it more difficult for cables to be taken or stolen.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A retractable cable system for coiling and uncoiling a cable, the system comprising:
    a) an axle;
    b) a first drum adapted and configured to be non-rotatably coupled to the axle, and a second drum adapted and configured to be rotatably coupled to the axle;
    c) a shaft-pulley assembly including a shaft having a first end and a second end, and a pulley having an outer circumference, wherein the first end of the shaft is adapted and configured to be rotatably coupled to the axle, and the second end of the shaft is adapted and configured to be coupled to the pulley; and
    d) a spring adapted and configured to couple to the shaft and the first drum to provide torque to the shaft as the shaft rotates with respect to the axle, wherein a cable is configured to wrap around the first and second drums and the outer circumference of the pulley, and wherein the second drum rotates around the axle and the shaft-pulley assembly rotates around the axle as the cable is being coiled and uncoiled.

2. The system of claim 1, wherein the cable includes a first end configured to couple to a connector, and a second end or a portion of the cable adjacent to the second end that is fixed to the first drum and configured to couple to a horizontal link.

3. The system of claim 2, wherein the second end is sized and configured to anchor the second end of the cable or a portion of the cable adjacent to the second end to the first drum, so that the cable is prevented from being pulled out of the retractable system when the cable is uncoiled.

4. The system of claim 1, wherein the first and second drums include one or more grooves adapted and configured for the cable to be positioned within.

5. The system of claim 1, wherein the spring is configured to nest inside the first drum.

6. The system of claim 1, wherein a length dimension of the second drum is larger than a length dimension of the first drum.

7. The system of claim 1, wherein the pulley includes first and second lips around the outer circumference of the pulley.

8. The system of claim 1, wherein the second drum is configured to move or slide along the axle with respect to the first drum.

9. The system of claim 1, wherein as the cable is being coiled, the second drum rotates around the axle in a counter-clockwise direction, and the shaft-pulley assembly rotates around the axle in a clockwise direction.

10. The system of claim 9, wherein as the cable is being uncoiled, the second drum rotates around the axle in a clockwise direction, and the shaft-pulley assembly rotates around the axle in a clockwise direction.

11. The system of claim 1, wherein the system is adapted and configured to mount to a wall.

* * * * *